US006277195B1

United States Patent
Iijima et al.

(10) Patent No.: US 6,277,195 B1
(45) Date of Patent: Aug. 21, 2001

(54) ROTATION TRANSMISSION APPARATUS AND APPARATUS FOR FORMING SURFACE FILM OF PANEL FOR CATHODE-RAY TUBES USING THE SAME

(75) Inventors: Hisashi Iijima, Omiya; Hitoshi Takeda, Konosu, both of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/319,882

(22) PCT Filed: Sep. 25, 1998

(86) PCT No.: PCT/JP98/04291

§ 371 Date: May 25, 1999

§ 102(e) Date: May 25, 1999

(87) PCT Pub. No.: WO99/15800

PCT Pub. Date: Apr. 1, 1999

(30) Foreign Application Priority Data

Sep. 25, 1997 (JP) .................................................. 9-260671

(51) Int. Cl.$^7$ .................................................. B05C 13/02
(52) U.S. Cl. ................ 118/52; 118/56; 118/319; 118/320; 118/500; 118/503
(58) Field of Search ................ 118/52, 56, 319, 118/320, 500, 503; 427/64, 72, 240, 425; 269/908

(56) References Cited

U.S. PATENT DOCUMENTS

| 3,672,932 | * | 6/1972 | D'Augustine | 427/72 |
| 3,701,674 | * | 10/1972 | Kimbrough | 427/72 |
| 3,791,846 | * | 2/1974 | Nuehring | 427/72 |
| 3,824,955 | * | 7/1974 | Marks et al. | 118/52 |

FOREIGN PATENT DOCUMENTS

| 6-66817 | 3/1994 | (JP) . |
| 7-63947 | 7/1995 | (JP) . |

* cited by examiner

*Primary Examiner*—Laura Edwards
(74) *Attorney, Agent, or Firm*—Pillsbury Winthrop LLP

(57) ABSTRACT

An apparatus for forming a panel surface film of a cathode ray tube is provided with a faceplate having an opening for supporting the cathode ray tube in such a manner that the panel surface of the cathode ray tube is exposed when inserted in the opening and is directed downward, a base member, a bearing, provided for the base member, for rotatably supporting the faceplate, and a torque transmission mechanism, coupled to a torque source, for transmitting torque of the torque source to the faceplate through the bearing. The bearing includes an outer ring having a circular inner shape, an inner ring rotatably fitted within the outer ring, rolling elements arranged between the outer ring and the inner ring, a coupling section which is formed on one of the outer and inner rings and to which the faceplate is coupled, and a fixing section which is formed on another one of the outer and inner rings and which is fixed to the base member.

11 Claims, 6 Drawing Sheets

ROTATION TRANSMISSION APPARATUS AND APPARATUS FOR FORMING SURFACE FILM OF PANEL FOR CATHODE-RAY TUBES USING THE SAME

TECHNICAL FIELD

The present invention relates to a torque transmission apparatus made up of a reduced number of structural parts, an apparatus for forming a panel surface film of a cathode ray tube and employing the torque transmission apparatus, and a unit for forming panel surface films of cathode ray tubes.

BACKGROUND ART

In general, a rotation apparatus, generally referred to as a spin head, is employed for forming the panel surface film of a cathode ray tube. A plan view of the rotation apparatus is shown in FIG. 1A, and a front view thereof is shown in FIG. 1B. As shown in FIGS. 1A and 1B, the rotation apparatus comprises: a discoid faceplate 2 for holding the periphery of the panel of a cathode ray tube 1 fitted therein in such a manner that the cathode ray tube 1 is directed downward; and a plurality of support rollers (e.g., four rollers) 3a, 3b, 3c and 3d arranged at regular intervals around the faceplate 2. The faceplate 2 is rotatably supported by the support rollers 3a, 3b, 3c and 3d. A rotating roller 4, which is coupled to a driving motor 6 through a gear mechanism 5, is in contact with the outer circumference of the faceplate 2. The faceplate 2 is rotated at high speed by means of the gear mechanism 5 and the rotating roller 4 when the driving motor 6 is actuated.

In this type of rotation apparatus, however, the support rollers 3a, 3b, 3d and 3d and the driving roller 4 are in contact with the outer circumference of the faceplate 2. In addition, the driving roller 4 is coupled to the driving motor 6 through the gear mechanism 5. Therefore, when the faceplate 2 is rotated at high speed, the rotation apparatus makes a loud noise. In the case of a panel surface film formation apparatus comprising dozen or so rotation apparatuses, the level of the noise made will be as high as 96 phons, and a solution to this problem is thus desired.

Since the support rollers 3a, 3b, 3c and 3d and the driving roller 4 are kept in contact with the outer circumference of the faceplate 2, they may be abraded very much due to the rotation, and may become eccentric. In addition, since dust is caused by the abrasion, maintenance is troublesome.

As described above, the conventional rotation apparatus, wherein the faceplate is supported by means of support rollers that are in contact with the outer circumference of the faceplate and is rotated by the driving roller that are also in contact with that outer circumference, has problems in terms of the high-level noise it makes, the eccentricity due to abrasion, the generation of dust, etc.

The present invention has been made in consideration of the above circumstances, and one object of the invention is to provide a torque transmission apparatus which suppresses the noise and abrasion and is of a simple structure.

Another object of the present invention is to provide an apparatus adapted for forming a panel surface film of a cathode ray tube and employing a torque transmission apparatus which suppresses the noise and abrasion and is of a simple structure.

A still another object of the present invention is to provide an apparatus adapted for forming a panel surface film of a cathode ray tube and employing a plurality of torque transmission apparatuses each of which suppresses the noise and abrasion and is of a simple structure.

DISCLOSURE OF INVENTION

According to the present invention, there is provided a torque transmission apparatus comprising:
  a bearing, supported on a stationary structural member, for rotatably supporting a body to be rotated; and
  a torque transmission, coupled to a torque source, for transmitting torque of the torque source to the body through the bearing;
  the bearing including:
    an annual outer member having a circular inner shape;
    an annual inner member rotatably fitted within the outer member and having a circular outer shape;
    rolling elements arranged between the outer member and the inner member;
    a coupling section which is formed on one of the outer and inner members and to which the body to be rotated is coupled; and
    a fixing section which is formed on another one of the outer and inner members and which is fixed to the stationary structural member.

The present invention also provides an apparatus for forming a panel surface film (an antireflection film) of a cathode ray tube, comprising:
  a faceplate having an opening for supporting the cathode ray tube such that the panel surface of the cathode ray tube is exposed when inserted in the opening and is directed downward;
  a base member;
  a bearing, provided for the base member, for rotatably supporting the faceplate; and
  a torque transmission mechanism, coupled to a torque source, for transmitting torque of the torque source to the faceplate through the bearing;
  the bearing including:
    an outer ring having a circular inner shape;
    an inner ring rotatably fitted within the outer ring and having a circular outer shape;
    rolling elements arranged between the outer ring and the inner ring;
    a coupling section which is formed on one of the outer and inner rings and to which the faceplate is coupled; and
    a fixing section which is formed on another one of the outer and inner rings and which is fixed to the base member.

The present invention further provides a formation unit for forming panel surface films of cathode ray tubes, comprising:
  a plurality of formation apparatuses, arranged at different positions, for forming the panel surface films of the cathode ray tubes;
  a mechanism for moving a cathode ray tube to a panel surface film formation apparatus at a first position;
  a mechanism, located at a second position, for coating a panel surface film-forming solution;
  a mechanism, located at a third position, for drying a coating of the panel surface film-forming solution; and
  a mechanism for sequentially moving the panel surface film-forming apparatuses from the first position to the second position and from the second position to the third position, each of the apparatuses for forming the panel surface films of the cathode ray tubes including:

a faceplate having an opening for supporting the cathode ray tube such that the panel surface of the cathode ray tube is exposed when inserted in the opening and is directed downward;

a base member;

a bearing, provided for the base member, for rotatably supporting the faceplate; and a torque transmission mechanism, coupled to a torque source, for transmitting torque of the torque source to the faceplate through the bearing;

the bearing including:
an outer ring having a circular inner shape;
an inner ring rotatably fitted within the outer ring;
rolling elements arranged between the outer ring and the inner ring;
a coupling section which is formed on one of the outer and inner rings and to which the faceplate is coupled; and
a fixing section which is formed on another one of the outer and inner members and which is fixed to the base member.

BEST MODE OF CARRYING OUT THE INVENTION

The best mode of carrying out the invention will be now described with reference to the accompanying drawings.

Figure 1A:
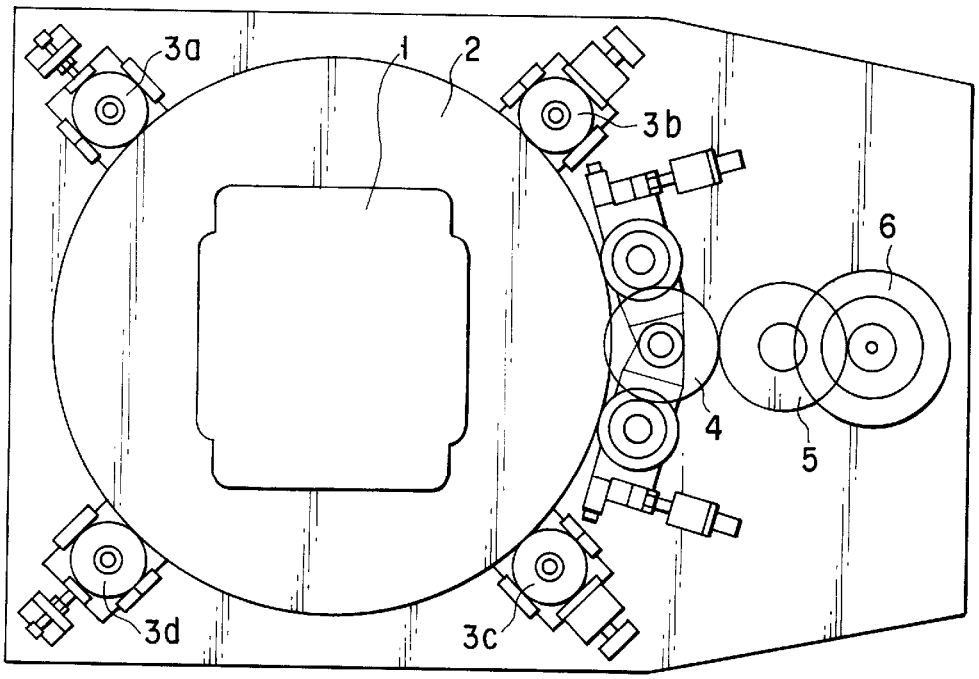
FIG. 1A is a plan view of a conventional spin head.
Figure 1B:
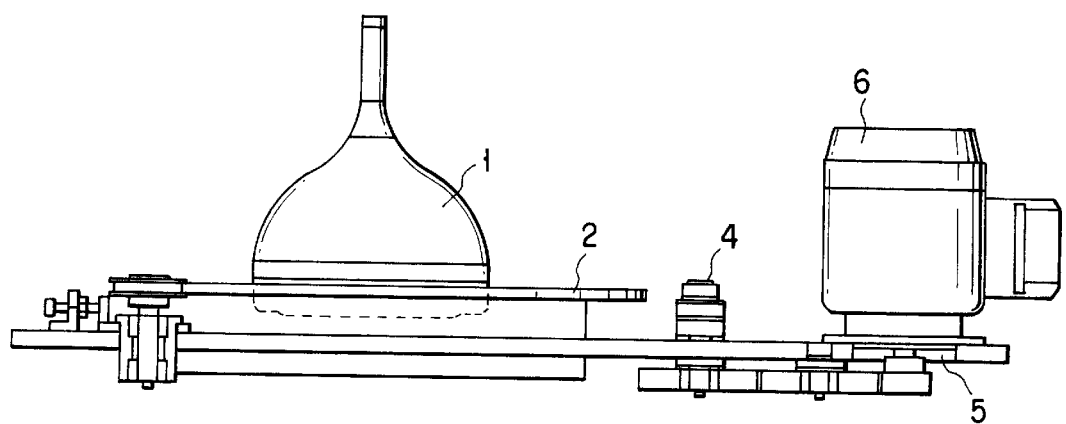
FIG. 1B is a front view of the conventional spin head.
Figure 2:
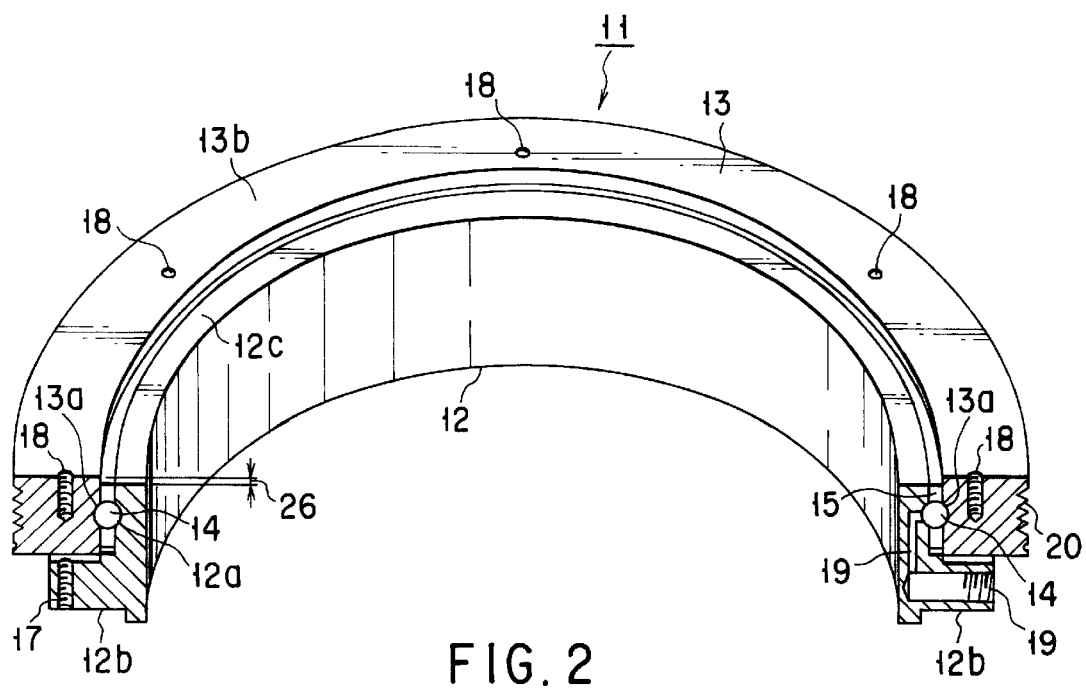
FIG. 2 is a partially-cutaway perspective view showing a large-diameter bearing employed in the torque transmission apparatus of the present invention.
Figure 3:
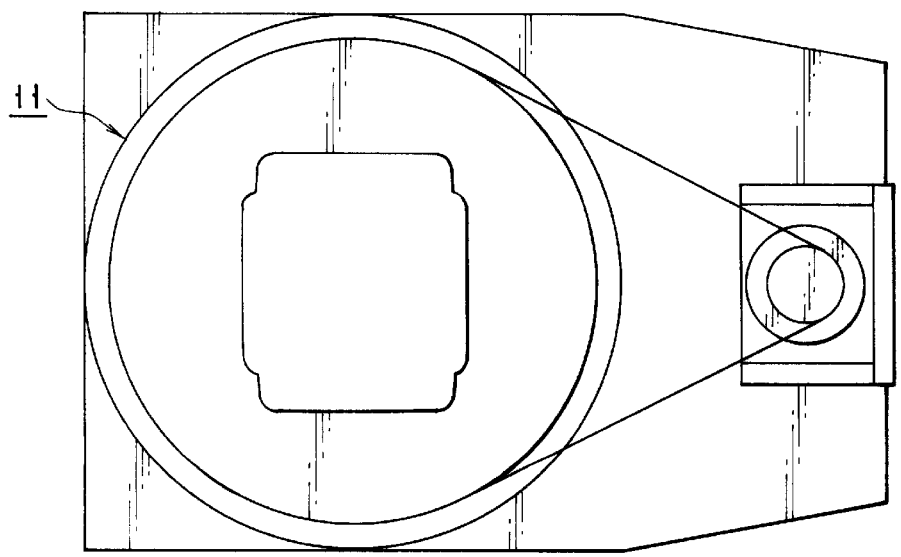
FIG. 3 is a top view showing a formation apparatus, incorporating the torque transmission apparatus of the present invention, for forming the panel surface film of a cathode ray tube.
Figure 4:
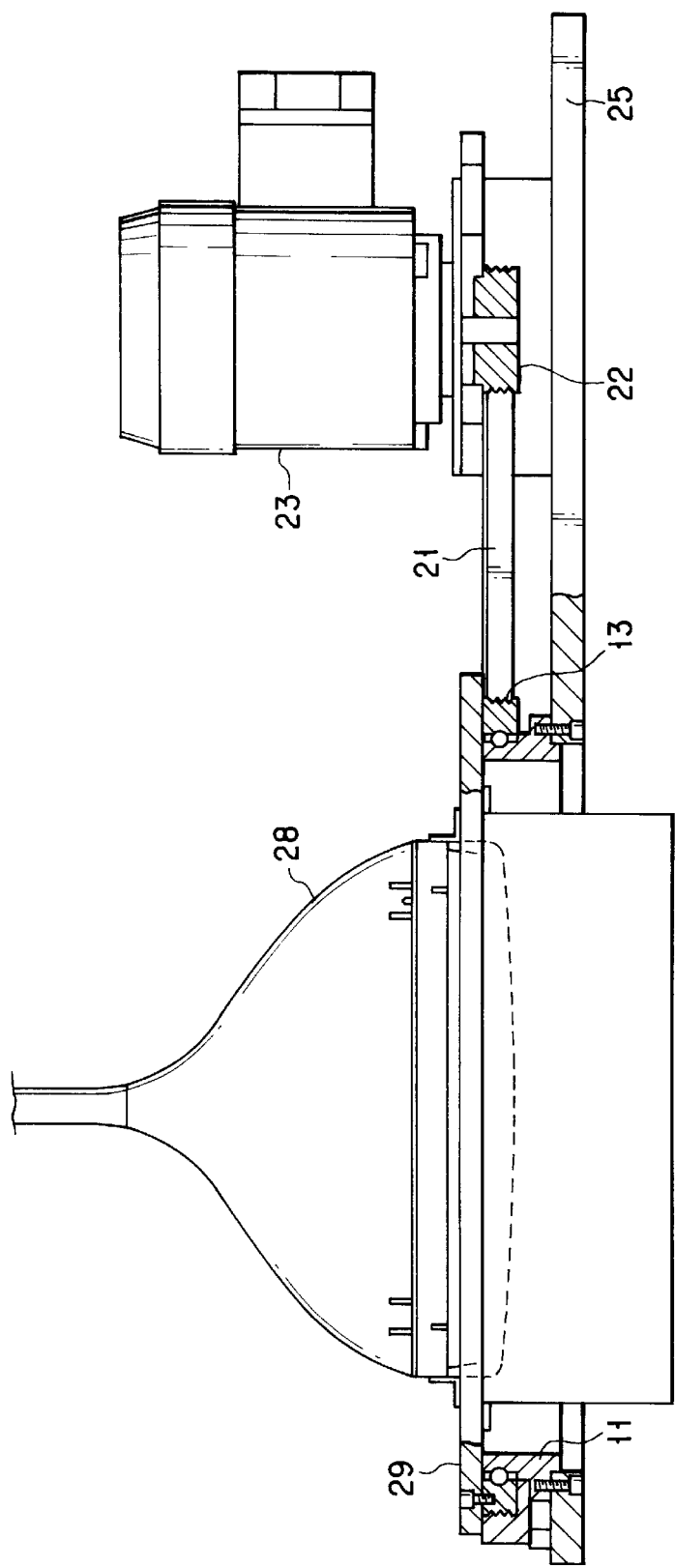
FIG. 4 is a front view of what is shown in FIG. 3.
Figure 5:
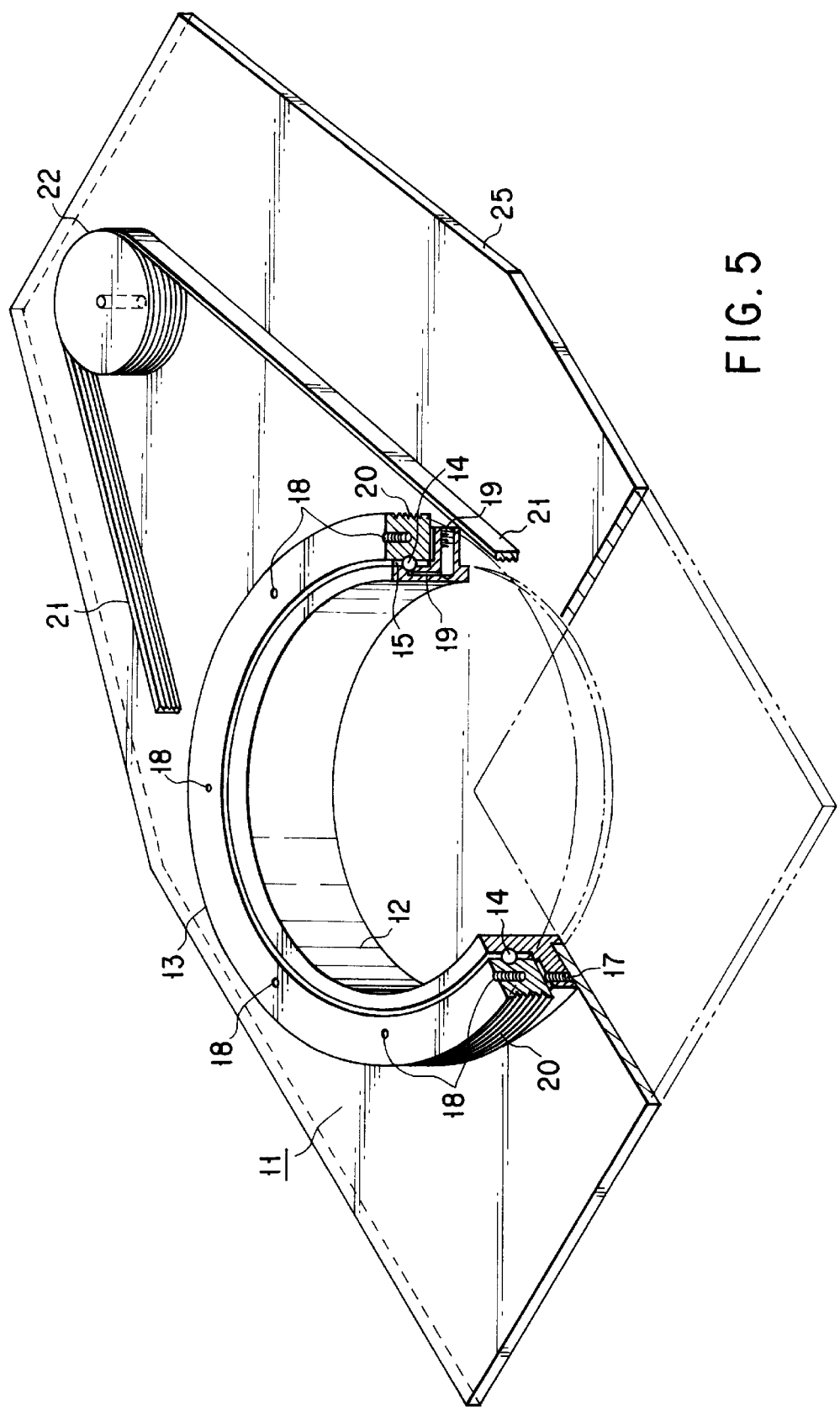
FIG. 5 is a perspective view of what is shown in FIG. 3.

FIG. 2 is a partially-cutaway perspective view showing a large-diameter bearing employed in the torque transmission apparatus of the present invention; FIG. 3 is a top view showing a formation apparatus, incorporating the torque transmission apparatus of the present invention, for forming the panel surface film of a cathode ray tube; FIG. 4 is a front view of what is shown in FIG. 3; and FIG. 5 is a perspective view of what is shown in FIG. 3.

As shown in FIG. 2, a large-diameter bearing 11 is made up of an inner ring 12 which is an annular inner member having a circular outer shape, and an outer ring 13 which is an annular outer member having an inner diameter slightly larger than the outer shape of the inner ring 12. The inner ring 12 is fitted inside the outer ring in a concentric manner, with a predetermined distance maintained with reference to the outer ring 13. A plurality of rolling elements 14, such as balls or rollers, are interposed between the inner ring 12 and the outer ring 13 in such a manner as to be rollable.

The rolling elements 14 are held by separators 15 interposed between the inner ring 12 and the outer ring 13, in such a manner that predetermined intervals are maintained between the rolling elements 14 in the circumferential direction. The rolling elements 14 are rollable between a raceway groove 12a formed in the outer circumferential face of the boss portion (i.e., the portion that protrudes upward) of the inner ring 12 and a raceway groove 13a formed in the inner circumferential face of the outer ring 13. In other words, the inner ring 12 and the outer ring 13 are combined together by means of the rolling elements 14 held by the separators 15, thereby forming one body. With this structure, accurate high-speed rotation is enabled.

The lower portion of the inner ring 12 is outwardly projected (in the radial direction) to constitute a flange section 12b. A plurality of fixing holes 17 used for fixing to a stationary structural component (e.g., a base) are formed in the lower face of the flange section 12b in such a manner that the fixing holes 17 are arranged at predetermined intervals in the circumferential direction. On the other hand, coupling holes 18 used for coupling to a body to be rotated (e.g., a faceplate for supporting the panel of a cathode ray tube) are formed in the upper face 13b of the outer ring 13 in such a manner that the coupling holes are arranged at predetermined intervals in the circumferential direction.

A structure converse to that described above can be adopted. In this case, the coupling holes 18 used for coupling to the body to be rotated are formed in the inner ring 12, while the fixing holes 17 used for fixing to the stationary structural component are formed in the outer ring 13. In other words, the outer ring 13 is stationary, and the inner ring 12 is rotated.

The inner ring 12, which is fixed to a stationary structural component (not shown) through the use of the fixing holes 17, is provided with a through passage 19 for the supply of a lubricant. The through passage 19 extends from the outer circumferential face of the flange section 12b and leads to the raceway groove 12a along which the rolling elements 14 roll.

A plurality of pulley grooves 20 for rotation are formed in the outer circumferential face of the outer ring 13. Each of the pulley grooves 20 has a V-shaped cross section. As shown in FIGS. 3 and 4, a V belt 21 is wound around the pulley grooves 20, and the outer ring 13 is connected to a small-sized pulley 22 of a driving section through the V belt 21. The outer ring 13 is rotated in accordance with the rotation of a driving motor 23 connected directly to the small-sized pulley 22.

As shown in the Figures, the small-sized pulley 22 and the driving motor 23 are mounted and fixed on a base 25. Likewise, the large-diameter bearing 11 is fixed to the base 25 by means of screws that are inserted in the fixing holes 17 formed in the flange section 12b of the inner ring 12.

In the torque transmission apparatus of the above structure, the outer ring 13 of the large-diameter bearing 11 is rotated by the small-sized pulley 22 and the V belt 21 when the driving motor 23 is driven. In this case, the body to be rotated is fixed on the upper face 13b of the outer ring 13 by means of the screws that are inserted in the coupling holes 18, as described above. When the outer ring 13 is rotated, the interference with the stationary inner ring 12 fixed to the base 25 must be prevented. For this purpose, a step 26 is provided between the upper face 13b of the outer ring 13 and the upper face 12c of the inner ring 12.

As shown, for example, in FIGS. 3–5, a faceplate 29, i.e., a body to be rotated, is coupled to the outer ring 13. In the center, the faceplate 29 has an opening corresponding to the outer diameter of the panel of the cathode ray tube 28. The panel 28 of the cathode ray tube 28 is fitted and held in the opening such that the cathode ray tube is directed downward. An antireflection film is coated or formed on the outer surface of the panel of the cathode ray tube 28 when the faceplate 29 held as above is rotated.

The faceplate 29 is fixed to the outer ring 13 by means of screws inserted in the coupling holes 18 formed on the upper face of the outer ring 13.

A description will now be given of the operation of the apparatus for forming the panel surface film (antireflection film) of the cathode ray tube explained above.

As shown in FIG. 4, the large-diameter bearing 11 is fixed to the base 23 by means of screws inserted in the fixing holes 17 formed in the flange section 12b of the inner ring 12. The faceplate 29, with which the panel of the cathode ray tube 28 is fitted and held in the downward state, is fixed to one side surface of the outer ring 13 of the large-diameter bearing 11.

In this state, the driving motor 23 on the base 25 is actuated, so that the outer ring 13 is rotated by means of the small-sized pulley 22 and the V belt 21. Hence, the faceplate 29 secured to one side of the outer ring 13 is rotated, and an antireflection film coating apparatus (not shown) coats or forms an antireflection film on the panel surface of the cathode ray tube 28 whose panel section is fitted inside the large-diameter bearing 11.

An antireflection film formation unit, which comprises a plurality of spin heads for forming antireflection films on the panel surfaces of cathode ray tubes arranged on the face plates at regular angular intervals, will be described with reference to FIGS. 6 and 7.

Figure 6:
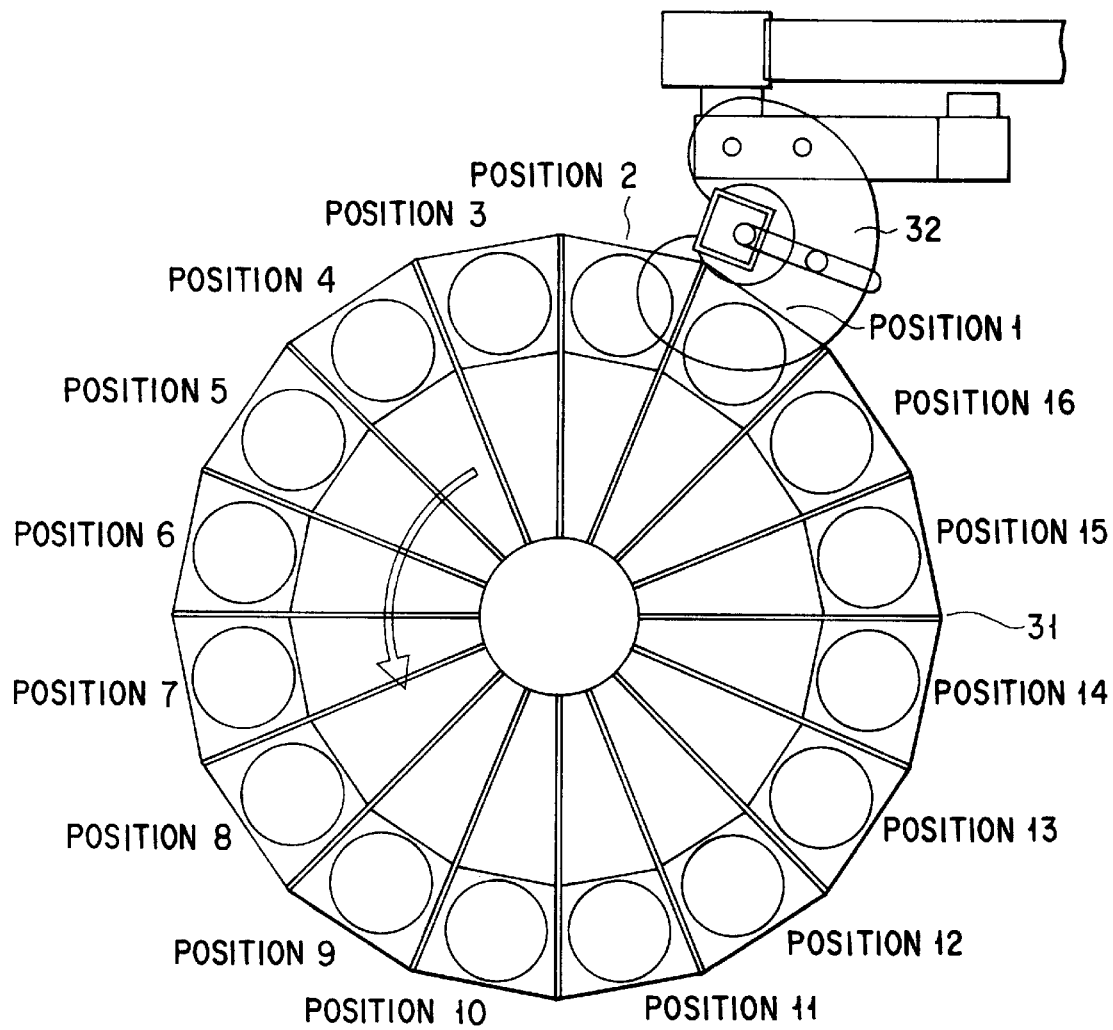
FIG. 6 shows the layout of a panel surface reflection prevention film-forming unit in which a plurality of panel surface reflection prevention film-forming apparatuses according to one embodiment of the present invention are circularly arranged.
Figure 7:
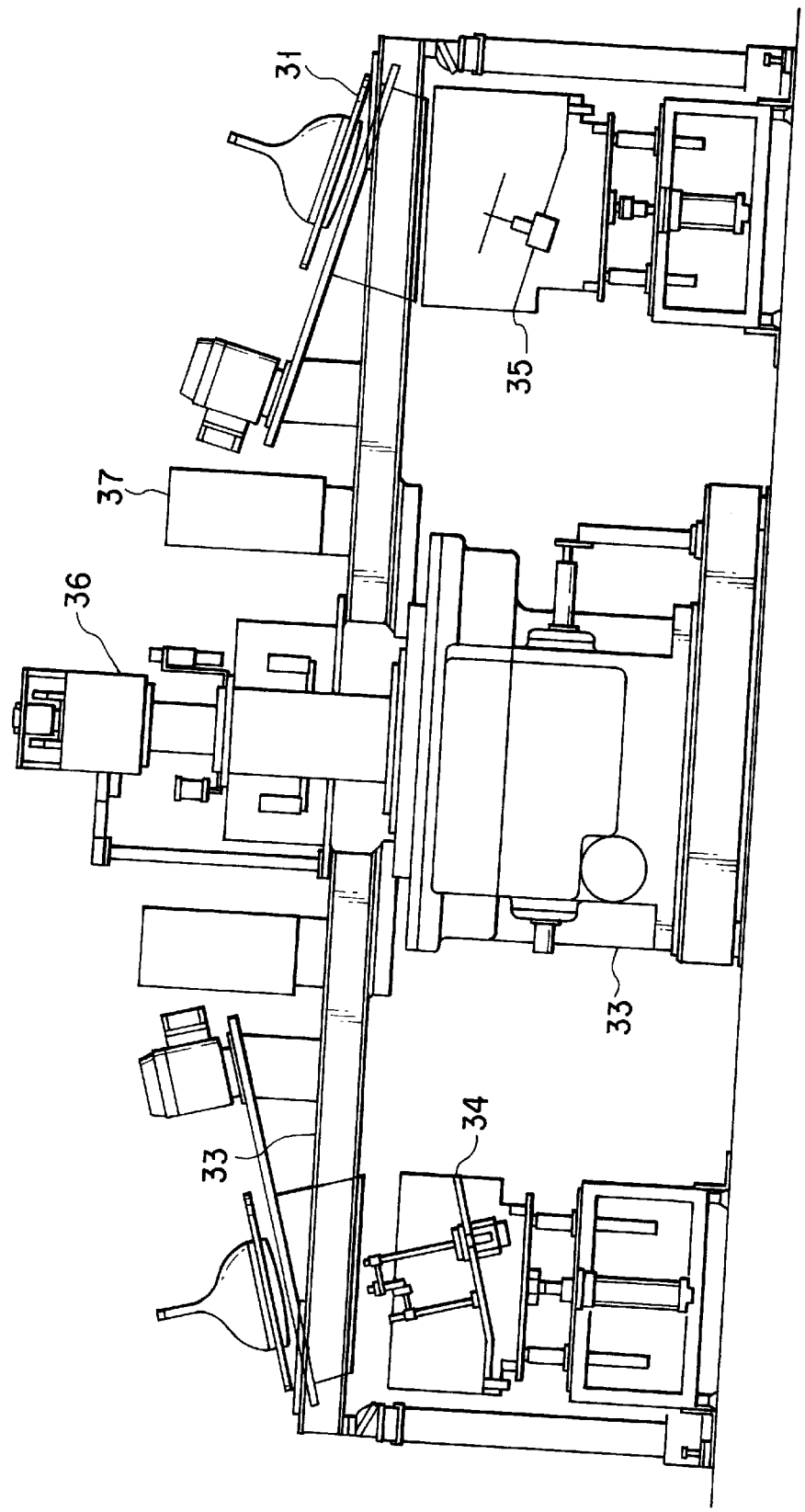
FIG. 7 is a front view of the panel surface reflection prevention film-forming unit shown in FIG. 6.

FIG. 6 shows the layout of a panel surface reflection prevention film-forming unit in which a plurality of panel surface reflection prevention film-forming apparatuses are circularly arranged, and FIG. 7 is a front view of the panel surface reflection prevention film-forming unit.

Referring to FIG. 6, spin heads 31, which number sixteen in all, are arranged at predetermined positions, namely from position 1 to position 16. A robot 32 for conveying a cathode ray tube is located in the neighborhood of position 1. The spin heads 31 arranged at the positions 1–16 rotate cathode ray tubes at the respective positions. The spin heads 16 themselves are revolved in the direction indicated by the arrow. With this structure, the cathode ray tubes move just like the earth in the solar system; that is, they are rotated on their own axes, while simultaneously revolving around a given point along with the respective spin heads 31.

As shown in FIG. 7, in the antireflection film formation unit, a spin head 31 is mounted on a spider 33 fixed on an index unit 33 in such a manner that the spin head 31 forms an angle of about 15° with a horizontal plane. A spray booth 34 is arranged under the spin head 31 on the left side, while a spin drive booth 35 is arranged under the spin head 31 on the right side. The spray booth 34 and the spin dry booth 35 are arranged at the positions 2–16 shown in FIG. 6. It should be noted that the spray booth 34 or the spin dry booth 35 need not be arranged under every spin head 31; they are arranged at appropriate intervals in accordance with the number of films to be formed.

A rotary joint 36 is located in the center. From this rotary joint 36, power is supplied to the driving motor (not shown) of each spin head 31 by way of an inverter (not shown) inside a VF box 37.

A description will now be given as to how antireflection films are formed on the panel surfaces of cathode ray tubes by the antireflection film formation unit shown in FIGS. 6 and 7 and described above.

First of all, at position 1, the robot 32 moves a cathode ray tube to the spin head 31 located at position 1 in such a manner that the panel surface of the cathode ray tube is directed downward. Subsequently, the spin head 31 is moved successively through positions 2 to 16 in accordance with the revolution of the spin head 31 caused by the index unit 33.

At positions 2 through 16, an antireflection film is formed in the manner described below. As shown in FIG. 7, the spray booth 34 arranged under the spin head 31 located at the predetermined position moves up and sprays the panel surface with a solution with which to form the first film. Then, the spin head spins the cathode ray tube at high speed to obtain a film of uniform thickness when the spin head 31 is revolved by the index unit 33 and moves to the next position, it is dried by the spin dry booth 35 arranged there. In this manner the first film is formed.

Thereafter, the spin head 31 is revolved by the index unit 33 and comes to the next spray booth 34, where the panel surface is sprayed with a solution for forming the second film. Subsequently, the spin head spins the cathode ray tube to obtain a film of uniform thickness, and the film is dried by the next spin dry booth 35. Since, as a result, the second film is formed, the formation of an antireflection film made up of the first and second films is completed.

Third and fourth films may be formed in accordance with the need.

In the example shown in FIGS. 6 and 7, the spin heads 31 are circularly arranged and are revolved by the index unit 33. The present invention, however, is not limited to this, and can be reduced to practice by arranging a plurality of spin heads in line. For example, a first 2-head unit wherein two spin heads are arranged above a first spray booth and a first spin dry booth, respectively, and a second 2-head unit wherein two spin heads are arranged above a second spray booth and a second spin dry booth, respectively, are provided in parallel to each other. In the first 2-head unit, the spin heads are moved to and from, thereby forming a first-layer film on the panel surface of a cathode ray tube. Then, the robot conveys the cathode ray tube to the second 2-head unit, where the spin heads are moved to and from, thereby forming a second-layered film.

As described above, the torque transmission apparatus of the present invention is remarkably advantageous in the points stated below. A body to be rotated, such as a faceplate, is coupled to one of the inner and outer rings 12 and 13 which jointly constitute the large-diameter bearing 11. The other ring is fixed directly to a stationary structural component, such as the base 25. In a torque transmission apparatus employing an ordinary type of bearing, an annular casing comprising a fixing section to be fixed to a stationary structural element is provided inward of the inner ring, and an annular casing comprising a coupling section to be coupled to a rotating body is provided outward of the outer ring, and these annular casings have to be integral with each other. This is not required in the case of the present invention, due to the structure described above.

An annular casing employed as part of the bearing of a conventional torque transmission apparatus has a diameter as large as 500 mm. Such a casing cannot be fabricated with high precision. Besides, an assembling operation for fitting the inner and outer rings into the casings are hard to perform.

In addition, in order to firmly secure the inner and outer rings of the bearing to the casings, a large number of components are needed, such as an annular push plate and screws for fixing the push plate.

The present invention, however, has eliminated the need to use such members. Accordingly, it is possible to provide a torque transmission apparatus which is easy to assemble and which comprises a simple-structure large-sized bearing made up of a small number of structural components.

The pulley grooves 20 are formed in the outer circumferential surface of either the inner ring 12 or the outer ring 13. With this structure, either the inner ring 12 or the outer ring 13 can be rotated directly by the small-sized pulley 22 of the driving section through the use of the V belt 21, which does not make a loud rotating noise.

In the case where the torque transmission apparatus comprising the large-diameter bearing 11 is incorporated in an apparatus for forming an antireflection film of a cathode ray tube, the faceplate 29, i.e., a body to be rotated, is fixed to one of the inner ring 12 and the outer ring 13. Hence, the faceplate 29 can be directly rotated, along with the cathode ray tube 28 held thereby. The inner ring 12 and the outer ring 13 are structural components of the bearing 11, and this construction, along with the use of the V belt, allows the apparatus to be a low noise type in comparison with the conventional spin head. The noise made during high-speed rotation can be remarkably reduced from 95 phons to 75 phons.

Moreover, since the abrasion can be remarkably suppressed, and no eccentricity is caused, the maintenance is easy.

Since the step 26 is provided between the upper face 13b of the outer ring 13 and the upper face 12c of the inner ring 12, the inner ring 12 and the outer ring 13 do not interfere with each other during rotation though the faceplate 29 is coupled to the upper face of either the inner ring 12 or the outer ring 13.

The through passage 19 for the supply of a lubricant is provided. The through passage 19 extends from the externally exposed face of either the inner ring 12 fixed to the base 25 or the outer ring 13 (for example, from the outer circumferential face of the flange section 12b of the outer ring 13), passes through the boss section, and leads to the raceway groove 12a along which the rolling elements 14 roll. Due to the provision of the through passage, the rolling elements 14 between the inner ring 12 and the outer ring 13 can be easily lubricated from an external position, and the maintenance is easy.

In the embodiment described above, the power transmission means is made of a belt having a number of V grooves. Needless to say, an ordinary V belt or a circular-section belt may be employed instead. In addition, the power transmission means is not limited to a belt but may be realized by gears, friction pulleys, or the like.

As described above, in the torque transmission apparatus of the present invention, one of the inner and outer rings of the bearing is provided with a fixing section for the fixing of the body to be rotated, while the other one of the rings is provided with a coupling section for the coupling of a stationary component. Unlike the conventional torque transmission apparatus, therefore, the apparatus of the present invention does not have to employ an annular casing provided with a fixing section or a coupling section. Hence, the apparatus of the present invention is made up of a small number of components, easy to assemble, and simple in structure.

In addition, one of the inner and outer rings of the bearing is rotated by use of a belt driven by the driving section, and the body to be rotated is coupled to the ring that is to be rotated. With this structure, the noise and abrasion at the time of rotation can be suppressed.

Furthermore, the raceway grooves along which the rolling elements roll are formed, and the through passage which leads to the raceway grooves for lubrication is formed. Due to the formation of these, the rolling elements can be easily lubricated, and the maintenance is thus easy.

Due to the provision of a step between the upper face of the inner ring and the upper face of the outer ring, interference between the rings is prevented at the time of rotation.

In the case where the body to be rotated is the faceplate of a cathode ray tube, it is possible to provide a panel surface antireflection film-forming apparatus which can remarkably suppress the noise and abrasion in comparison with the conventional spin head and which can be easily maintained.

What is claimed is:

1. An apparatus for forming a panel surface film of a cathode ray tube, comprising:
   a faceplate having an opening for supporting the cathode ray tube such that the panel surface of the cathode ray tube is exposed when inserted in the opening and is directed downward;
   a base member;
   a bearing, provided for the base member, for rotatably supporting the faceplate; and a torque transmission mechanism, coupled to a torque source, for transmitting torque of the torque source to the faceplate through the bearing;
   said bearing including:
      an outer ring having a circular inner shape;
      an inner ring rotatably fitted within the outer ring;
      rolling elements arranged between the outer ring and the inner ring;
      a coupling section which is formed on one of the outer and inner rings and to which the faceplate is coupled;
      a fixing section which is formed on another one of the outer and inner rings and which is fixed to the base member and
      a mechanism, located away from the panel surface of the cathode ray tube, for coating the panel surface with a solution used for forming the panel surface film.

2. An apparatus according to claim 1, further comprising a mechanism, located away from the panel surface of the cathode ray tube, for drying the coating solution applied on the panel surface which forms the panel surface film.

3. An apparatus according to claim 1, wherein one of said outer and inner rings is provided with a pulley groove formed in a circumferential surface thereof, and said torque transmission mechanism includes: a pulley provided for the torque source; and a belt that is in engagement with the pulley and the pulley groove.

4. An apparatus according to claim 1, wherein each of said outer and inner rings has a first surface and a second surface which are perpendicular to an axis of rotation, the first surface of said one of the outer and inner rings is fixed to the stationary structural member, and the body to be rotated is attached to the second surface of said another one of the outer and inner rings.

5. An apparatus according to claim 4, wherein a step is provided between the first surface of the outer ring and the first surface of the inner ring.

6. An apparatus according to claim 1, wherein said outer and inner rings have opposing faces in which raceway grooves for allowing the rolling elements to roll are formed, and at least one of the outer and inner rings is provided with a through passage for lubrication that leads to the raceway grooves.

7. A formation unit for forming panel surface films of cathode ray tubes, comprising:

a plurality of formation apparatuses, arranged at different positions, for forming the panel surface films of the cathode ray tubes;

a mechanism for moving a cathode ray tube to a panel surface film formation apparatus at a first position;

a mechanism, located at a second position, for coating a panel surface with a panel surface film-forming solution;

a mechanism, located at a third position, for drying the panel surface film-forming solution coating of the panel surface; and a mechanism for sequentially moving the panel surface film-forming apparatuses from the first position to the second position and from the second position to the third position, each of the apparatuses for forming the panel surface films of the cathode ray tubes including:

a faceplate having an opening for supporting the cathode ray tube such that the panel surface of the cathode ray tube is exposed when inserted in the opening and is directed downward;

a base member;

a bearing, provided for the base member, for rotatably supporting the faceplate;

a torque transmission mechanism, coupled to a torque source, for transmitting torque of the torque source to the faceplate through the bearing;

said bearing including:

an outer ring having a circular inner shape;

an inner ring rotatably fitted within the outer ring;

rolling elements arranged between the outer ring and the inner ring;

a coupling section which is formed on one of the outer and inner rings and to which the faceplate is coupled; and a fixing section which is formed on another one of the outer and inner members and which is fixed to the base member.

8. A formation unit according to claim 7, wherein one of said outer and inner rings is provided with a pulley groove formed in a circumferential surface thereof, and said torque transmission mechanism includes: a pulley provided for the torque source; and a belt that is in engagement with the pulley and the pulley groove.

9. A formation unit according to claim 7, wherein each of said outer and inner rings has a first surface and a second surface which are perpendicular to an axis of rotation, the first surface of said one of the outer and inner rings is fixed to the stationary structural member, and the body to be rotated is attached to the second surface of said another one of the outer and inner rings.

10. A formation unit according to claim 7, wherein a step is provided between the first surface of the outer ring and the first surface of the inner ring.

11. A formation unit according to claim 7, wherein said outer and inner rings have opposing faces in which raceway grooves for allowing the rolling elements to roll are formed, and at least one of the outer and inner rings is provided with a through passage for lubrication that leads to the raceway grooves.

* * * * *